United States Patent
Wu et al.

(10) Patent No.: US 6,867,954 B2
(45) Date of Patent: Mar. 15, 2005

(54) REVERSE WIRING PROTECTION DEVICE FOR GROUND FAULT CIRCUIT INTERRUPTER

(75) Inventors: Zhixin Wu, Yueqing (CN); Yinxian Wang, Yueqing (CN); Fu Wang, Yueqing (CN)

(73) Assignee: Zhejiang Dongzheng Electrical Co., Ltd. (CN)

( * ) Notice: Subject to any disclaimer, the term of this patent is extended or adjusted under 35 U.S.C. 154(b) by 166 days.

(21) Appl. No.: 10/279,105

(22) Filed: Oct. 24, 2002

(65) Prior Publication Data

US 2004/0021996 A1 Feb. 5, 2004

(51) Int. Cl.⁷ .............................................. H02H 3/00
(52) U.S. Cl. ....................................................... 361/42
(58) Field of Search ..................................... 361/42–50

(56) References Cited

U.S. PATENT DOCUMENTS 6,671,145 B2 * 12/2003 Germain et al. .............. 361/45

* cited by examiner

*Primary Examiner*—Ronald Leja
(74) *Attorney, Agent, or Firm*—Morris, Manning & Martin, LLP; Tim Tingkang Xia, Esq.

(57) ABSTRACT

The present invention relates to a reverse wiring protection device for ground fault circuit interrupter that includes a tripper and control circuit. The tripper comprises: a pull rod with flat, a L-shaped latch, a balance frame coupled with the latch moving up and down with the pull rod, a trip coil, a plunger and a contact switch (K) which is capable of energizing and de-energizing the trip coil. The reset can't be depressed when an installer or user miswires the line and the load. GFCI can only be operating normally when it is installed properly

6 Claims, 11 Drawing Sheets

REVERSE WIRING PROTECTION DEVICE FOR GROUND FAULT CIRCUIT INTERRUPTER

FIELD OF THE INVENTION

The present invention relates to ground-fault protection, especially, relates to the trip machine.

BACKGROUND OF THE INVENTION

Ground-fault circuit interrupter is used widely at present, because GFCI can prevent electric shock and fire caused by ground fault.

With the development of science and technology, GFCI is developing forwards high properties and multiple functions. As we all know. GFCI is without reverse wiring protection function in the past years. So it may be cause serious consequences, when a user reverses the line and the load. Another reverse wiring protection device is shown in the U.S. Pat. No. 6,052,265. In this reference, though the device is efficacious, there is a complicated circuit. So it increases the production cost and is more difficult to debug. In the GFCI shown in U.S. Pat. No. 6,246,558B, when the reset button is depressed, it's rather easy to cause said movable contacts and the flat of said latch out of shape, which may result in harm. And in the reverse wiring protection device shown in the U.S. Pat. No. 5,541,800, it only provides reverse wiring protection once, so this device has no reverse wiring protection again when it needs to be installed in a second time for some reasons.

The present invention is a reverse wiring protection device in the form of the flat of the pull rod, a micro-switch, and a relevant control circuit. It makes not only the GFCI have the reverse wiring protection function and improve the safety properties but also not bring the complex actuator. And there are the advantages of low production cost and safety for the device.

For the GFCI, the way it connects the load may not only pass through the entry ports of the face portion but also is connected by the load binding screws. So an installer and user can reverse the line and the load generally, however, if the GFCI does not have the reverse wiring protection function, it is just like a common receptacle.

SUMMARY OF THE INVENTION

The abbreviated form of the name for Ground Fault Circuit Interrupter is GFCI.

The primary object of the present invention is to provide a GFCI receptacle which, if inadvertently miswired by connecting the AC source to the load of the receptacle rather than to its input or, affords a positive indication, that the reset can't be depressed, to the installer or the user that a miswiring condition exists.

The reserve wiring protection device comprises pull rod, latch, balance frame, tripper, contact switch, and control circuit The pull rod has a flat on one end and a reset button on another end. The pull rod is attached with a reset spring. The flat has first surface and second surface. When the second surface of the flat contacts with the latch in the unlock position, the pull rod activates the contact switch and closes it. And it makes the trip coil energized, producing an electromagnetic force to act on the latch to move. However, the flat passes through the slot of the latch, and the first surface of the flat contacts with the latch. If the pressure is removed, the pull rod will activate the balance frame by the latch, and the balance frame lifts the movable contacts against the fixed contacts.

The tripper comprises trip coil, trip spring, and plunger moving perpendicularly along the direction that the pull rod moves. One end of plunger coupled with the second part of the latch that makes the latch activated to move between the lock position and the unlock position. In the lock position, the second part of the latch can block the (L) and (R) surface. In the unlock position, the plunger makes the latch activated, which overcomes the bias force from the trip spring to release the flat The contact switch makes the trip coil energized or de-energized.

Control circuit includes a time relay circuit energized by contact switch, which can maintain the energized time for the trip coil.

The balance frame has a central hole and a groove on the side, the pull rod extends within the central hole, and the second part of the latch extends within the groove.

The end of the pull rod having the flat is a cone that contacts with the contact switch. The first part of the latch has a slot The second part of the latch has a lock hole that one end is circular and another end is rectilinear.

The end of the plunger has an annular groove which fastens two sides of the slot of the latch. So the movement of the plunger may transfer the latch.

The time relay circuit includes a silicon controlled rectifier (SCR) and a charge circuit which comprises a resistor and a capacitor. The contact switch is connected in series with the charge circuit, the charge circuit is connected in series with the gate pole of the silicon controlled rectifier, and the positive pole of the SCR is connected in series with the trip coil.

The continued time for time relay circuit is 20–40 ms.

The control circuit also includes a ground-fault protection circuit.

GFCI will be de-energized when the user miswires by connecting the line to the load. So the present invention is more safe and reliable than previous art.

DETAILED DESCRIPTION OF THE PREFERRED EMBODIMENT

GFCI has various models, such as plug and receptacle type. The reverse wiring protection device is specialized for the GFCI receptacle.

Figure 1:
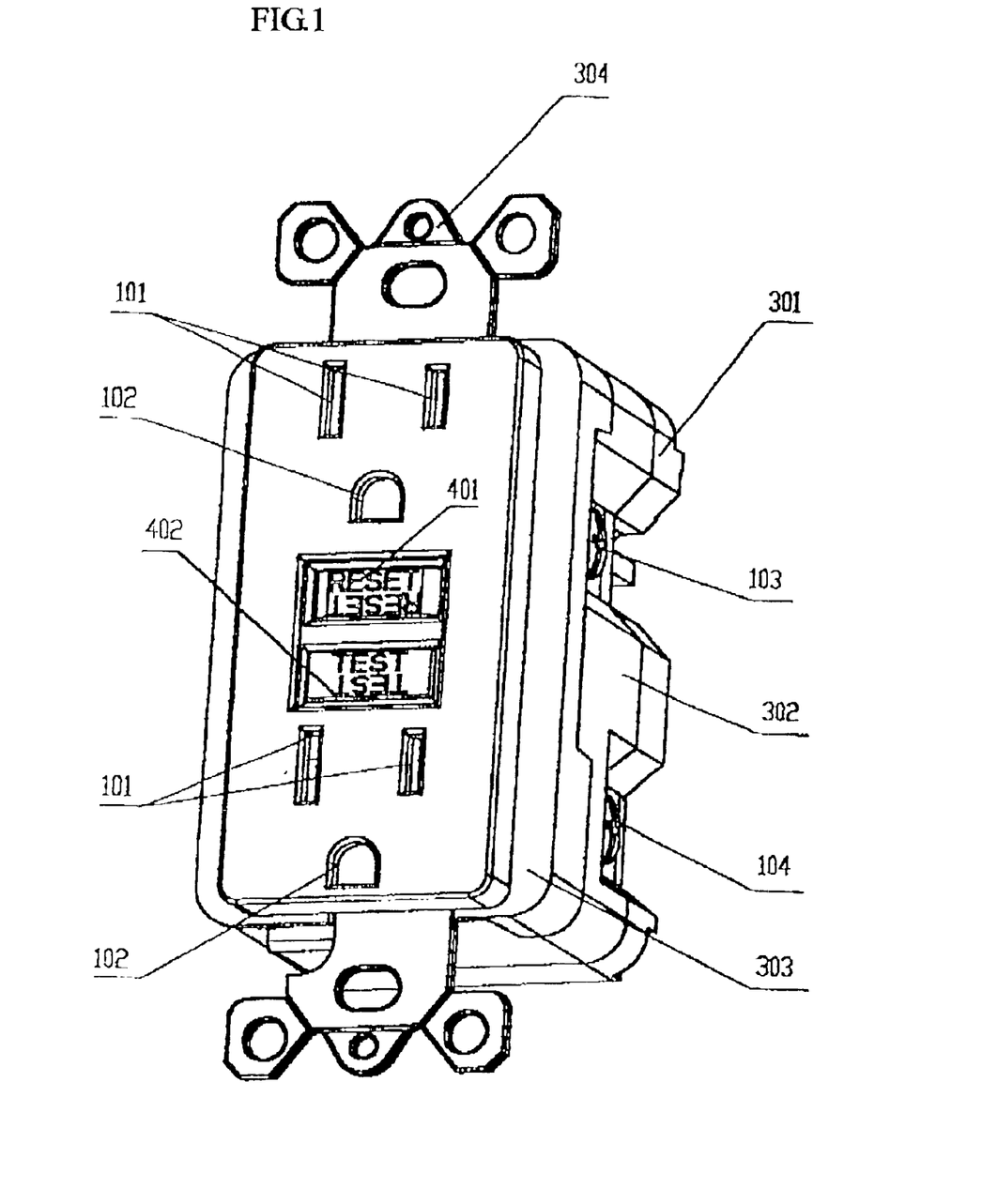
FIG. 1 is a perspective view showing the front of a fully assembled GFCI receptacle according to the present invention.

FIG. 1 is a perspective view of the GFCI receptacle according to the present invention. There are a reset button 401, a test button 402, entry ports 101, Ground-prong-receiving openings 102, a mounting strap 304, load binding screws 103 (It should be noted that another ground screw is located on the opposite side of the receptacle, not shown in it), line binding screws 104 (It should be noted that another binding screw is located on the opposite side of the receptacle, not shown in it), a rear portion 301, a housing 302, and a face portion 302.

Figure 2A:
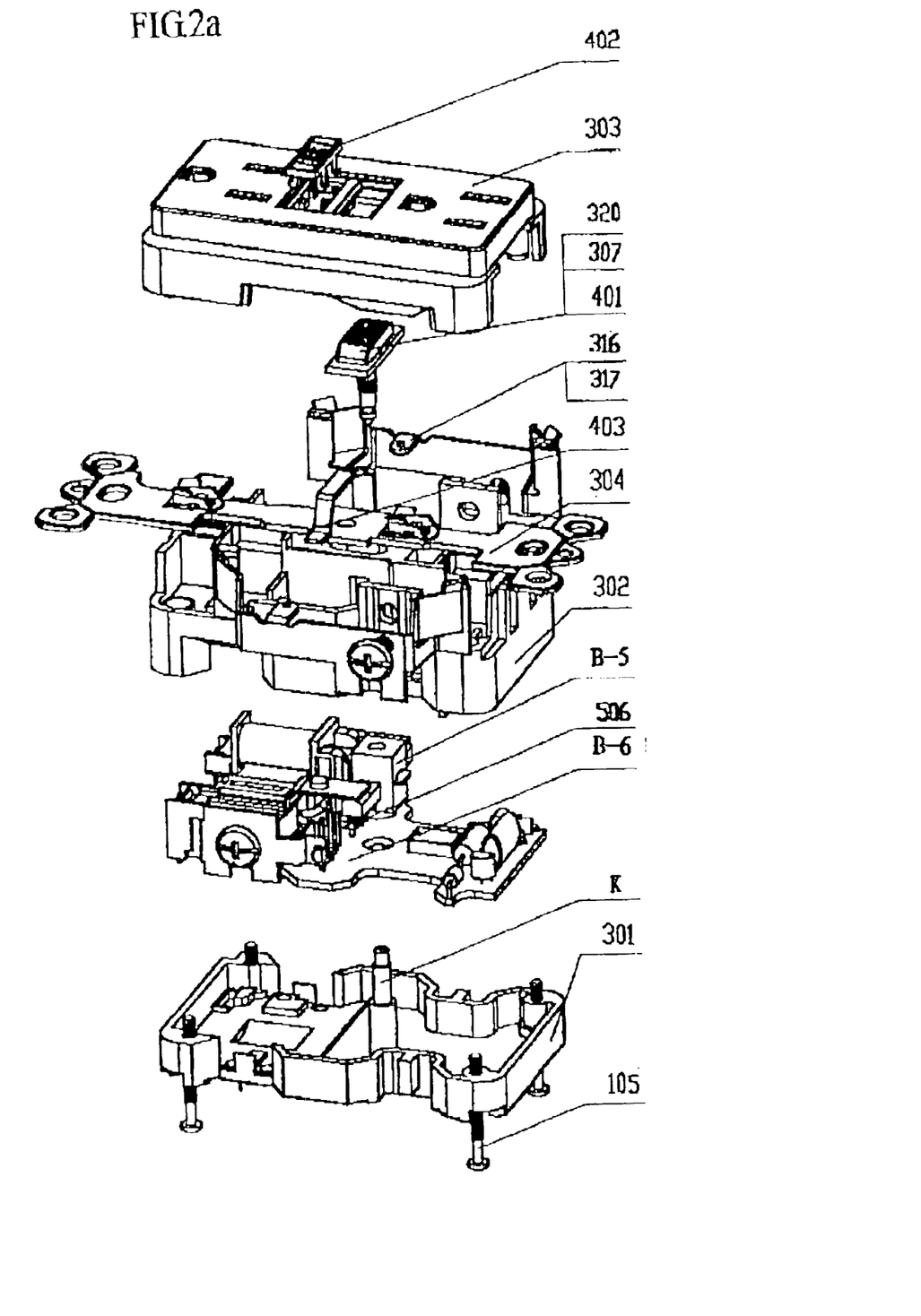
FIG. 2a is an exploded view of the GFCI receptacle of FIG. 1.
Figure 2B:
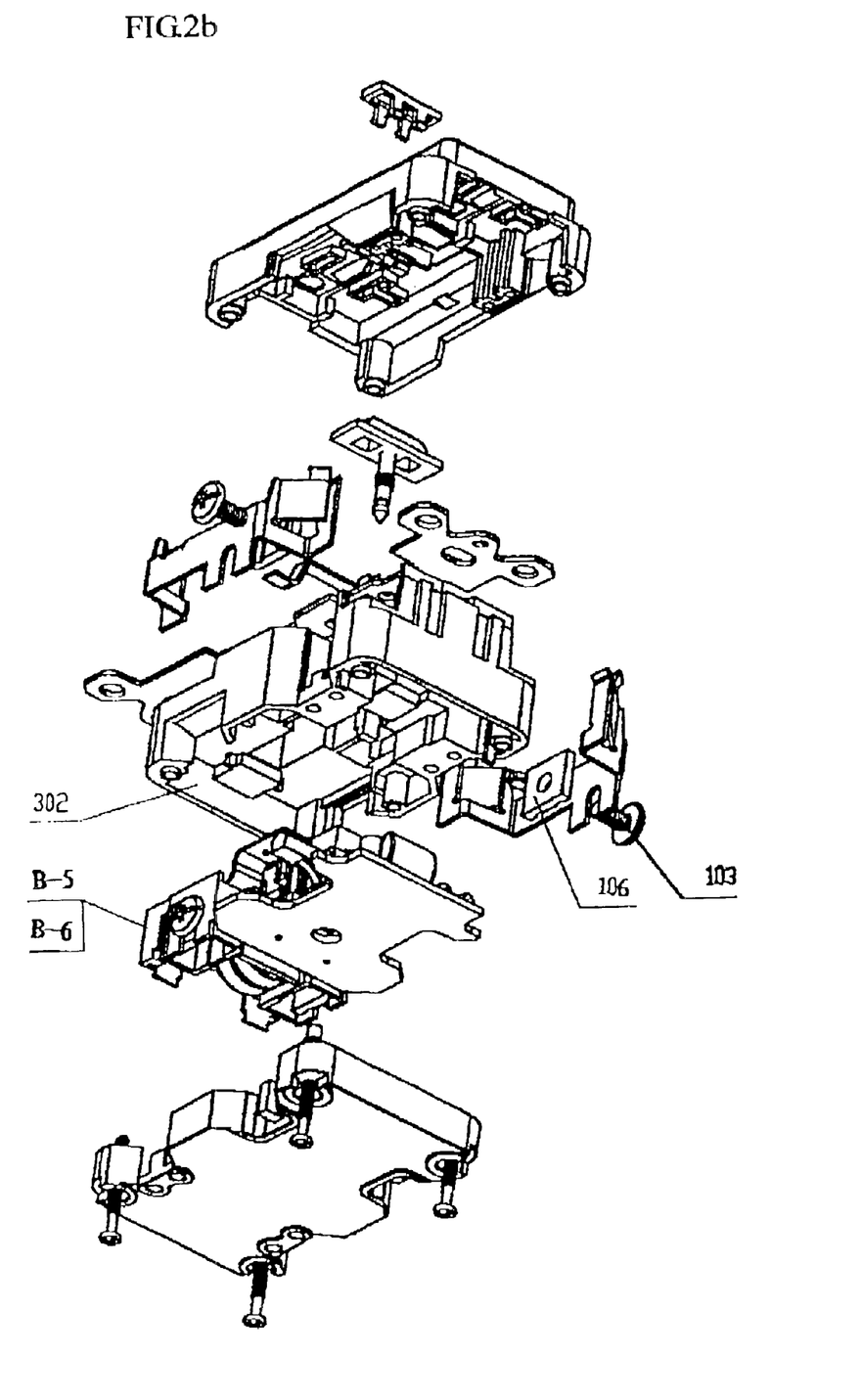
FIG. 2b is an another exploded view of the GFCI receptacle of FIG. 1.

FIG. 2 is an exploded view of the GFCI receptacle. This is to illustrate the assembled operational relation more clearly. The GFCI receptacle comprises rear portion 301, housing 302, face portion 303, tripper B-5, a part B-6 (which comprises the movable contacts, the integrated circuit, etc.), fixed contact 316, contacts 317, test strap 403, test button 402, reset button 403, reset spring 320, pull rod 307, mounting strap 304 (with binding screw and grounding strap), load binding screws 103, screw terminal 106, and fastening screws 105. The tripper B-5 is welded with the part B-6 through the pin 506 and is set into the fixed position of the housing 303, and assembling other parts in turn. The contact switch. K is fixed on the circular hole of the rear portion 301. Because the housing has a fixed slot, it will be in a fixed position when the tripper B-5 is set into. In addition, the two brackets of the balance frame 319 are set into the groove of the housing 302. In the tripping state, the top end on the rear portion just props up to the fixed position slot which is located on the bottom of the balance frame 319, keeping the pull rod 307, the central hole of the balance frame 319, and the contact switch K on the same axis all along. Finally, the device is removablly secured by four fastening screws.

Figure 3:
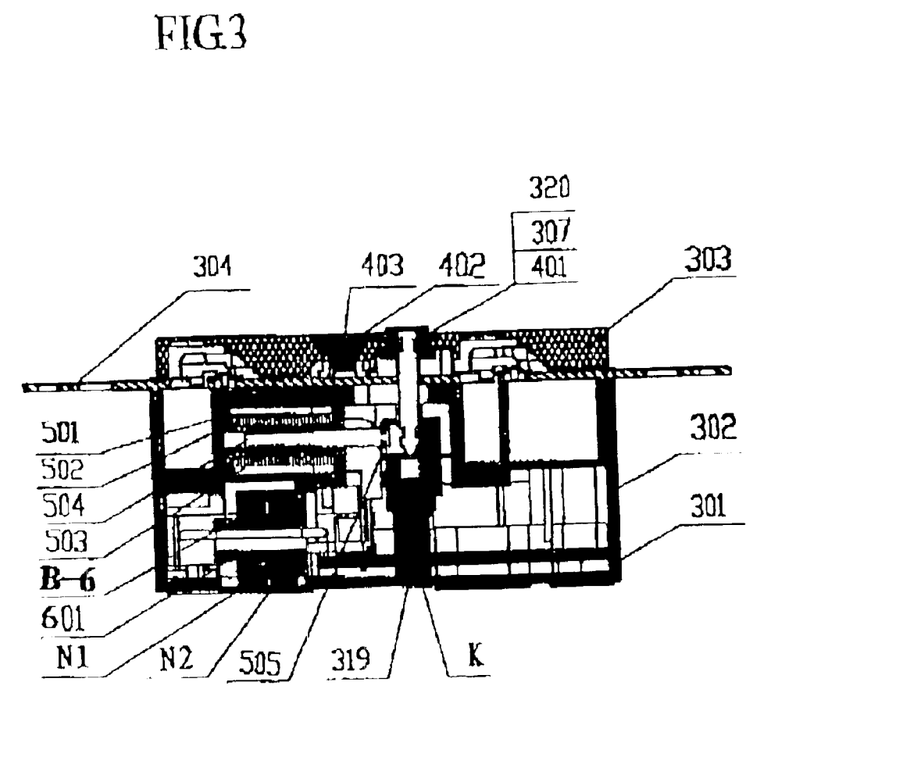
FIG. 3 is a detailed side view of the GFCI receptacle of FIG. 1, showing the device in a trip condition.

Refer to FIG. 3. There are coil yoke 501, trip coil 502, trip spring 503, plunger 504, latch 505, neutral coil N1, sense coil N2, balance frame 319, and movable contact frame 601. The coil frame is oriented by the slot on the housing 302 and the part B-6, so the plunger 504 in the coil yoke only moves back and forth in fixed direction. The latch 505 connected with the plunger 504 has a sliding slot 505a, the connected groove 504a on the plunger is just blocked into the two sides of the sliding slot In this way, the latch 505 is activated not only by the plunger 504 to move back and forth but also by the pull rod to move up and down.

The reverse wiring protection device comprises the tripper and control circuit.

Refer to FIGS. 4a, 4b and 4c. The tripper comprises trip coil 502, trip spring 503, plunger 504, reset button 401, reset spring 320, latch 505, contact switch k, and pull rod 307. The pull rod and the reset button are hot pressing together. There is a flat 307' on one end of the pull rod, the "L" and the "R" stand for two surfaces of the flat. Lock hole 505b has a perpendicular side on the right D and a circular side on the left H. When in the tripping condition, the circular side H of latch 505 leans against the taper part of the pull rod 307 because of the bias force from trip spring 503. And also because there is a flat on the pull, if the trip coil 502 is de-energized, the reset button 401 can't be reset. It's a key factor for reverse wiring protection according to the present invention.

Figure 5:
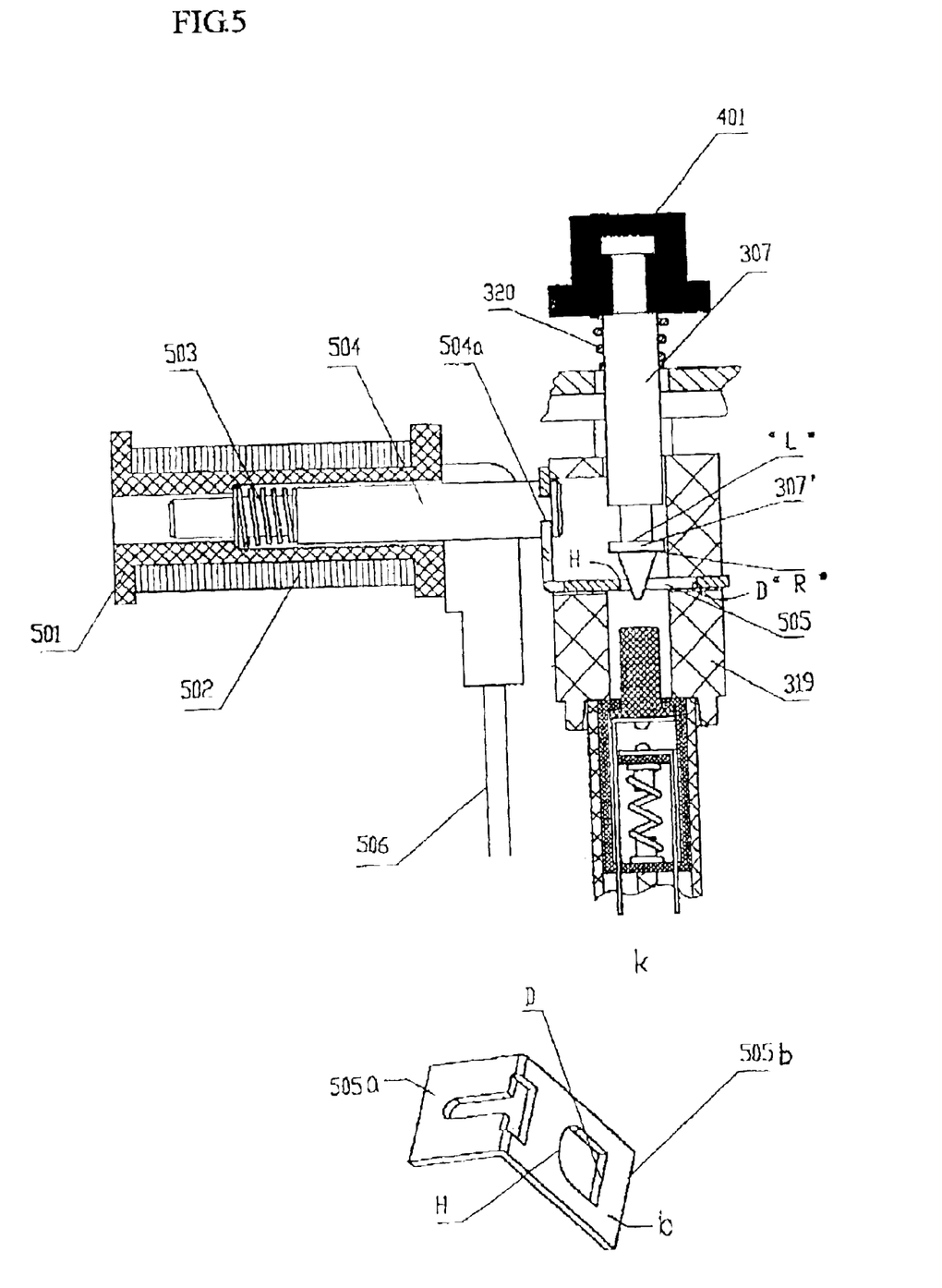
FIG. 5 is a transverse section view of the tripper, showing the tripper in the tripping condition.
Figure 6:
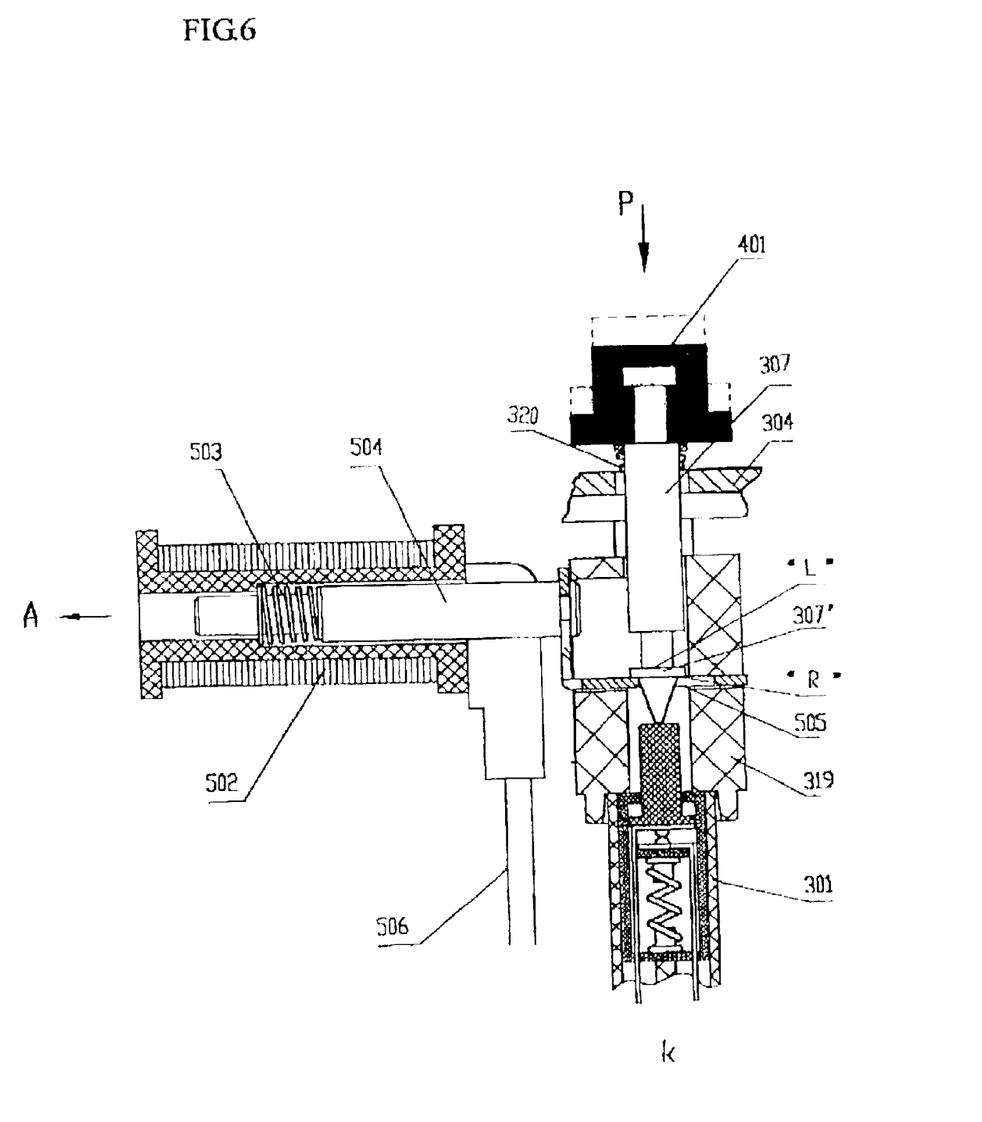
FIG. 6 is a transverse section view of the tripper, showing the condition of the tripper from tripping to closing.

Refer to FIG. 5 and FIG. 6. When the reset button is depressed, the pull rod 307 moves along the arrow P direction. When the surface R of the flat 307' is touching or is to be touching the latch 505, the micro-switch K closes for the taper of the pull rod 307 to depress. Under such circumstances, the trip coil energizes and produces a electromagnetic force to drive the plunger 504 to move along the arrow A direction. Because the latch is coupled with the plunger 504, the lock hole 505a of the latch also moves along in the arrow A direction. This causes the side H of the latch to be separate from the taper part of the pull rod. When the side H of the latch 505 moves and gets to certain position, the pressure from the direction P will cause the latch 505 to saltate quickly to the upper surface L of the flat 307'.

Figure 7:
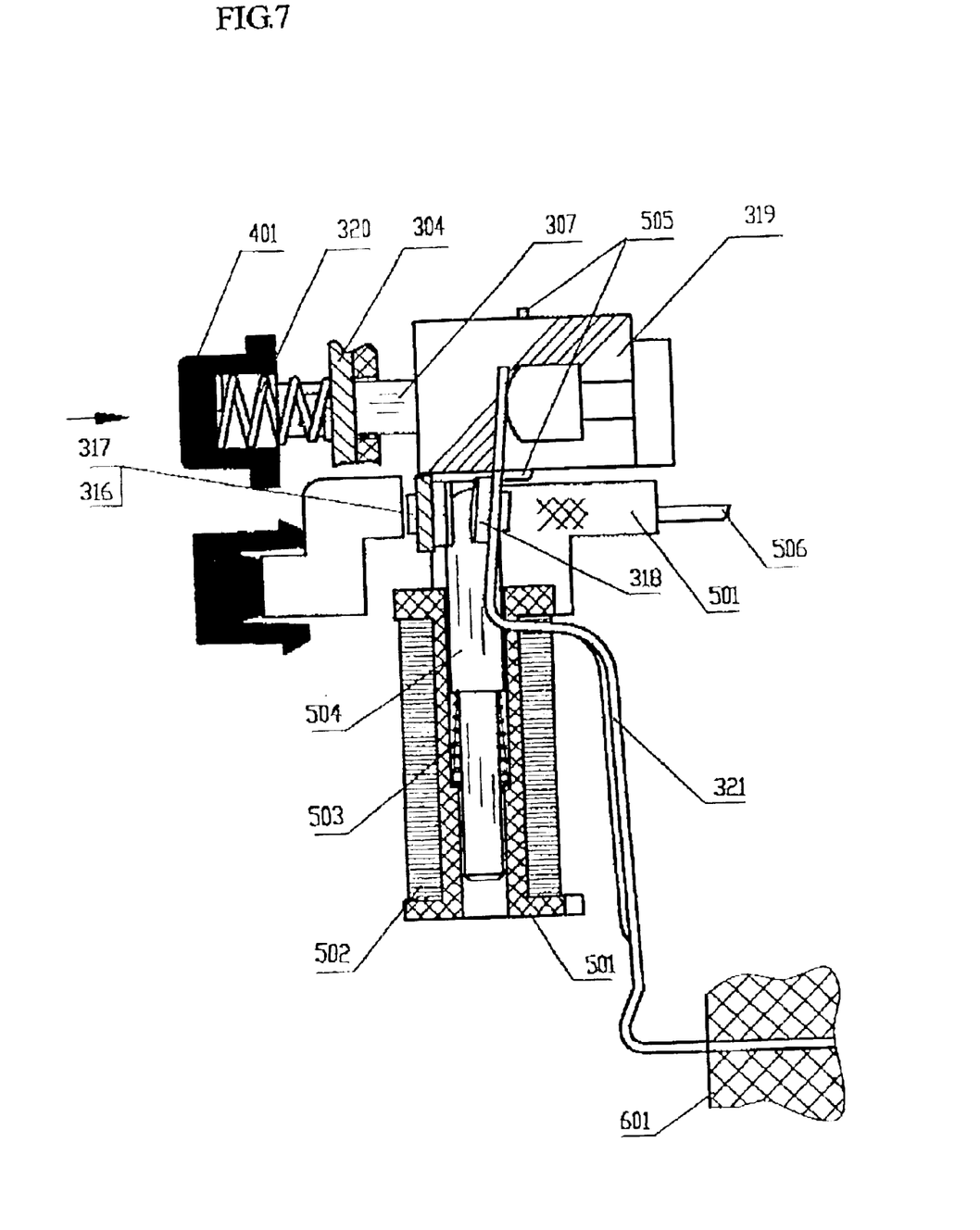
FIG. 7 is a part transverse section view, showing the position of the contacts.

Refer to FIG. 7. Wherein there exist the time relay circuit, the energized time for the trip coil is 20–40 mS. As mentioned above, the trip coil 502 is de-energized and the electromagnetic force disappears, when the latch 505 saltates to the side L of the flat 307', because of the bias force from the trip spring 503, the plunger will move along in the reverse direction of the arrow A. It makes the side H of the latch 505 lean against the pull rod 307 again. After the pressure is removed, the pull rod 307, for the elasticity of the reset spring 320, drives the balance frame 319 to move upwardly. And the balance frame lifts the movable contacts against the fixed contacts. So the GFCI device is energized.

Figure 8:
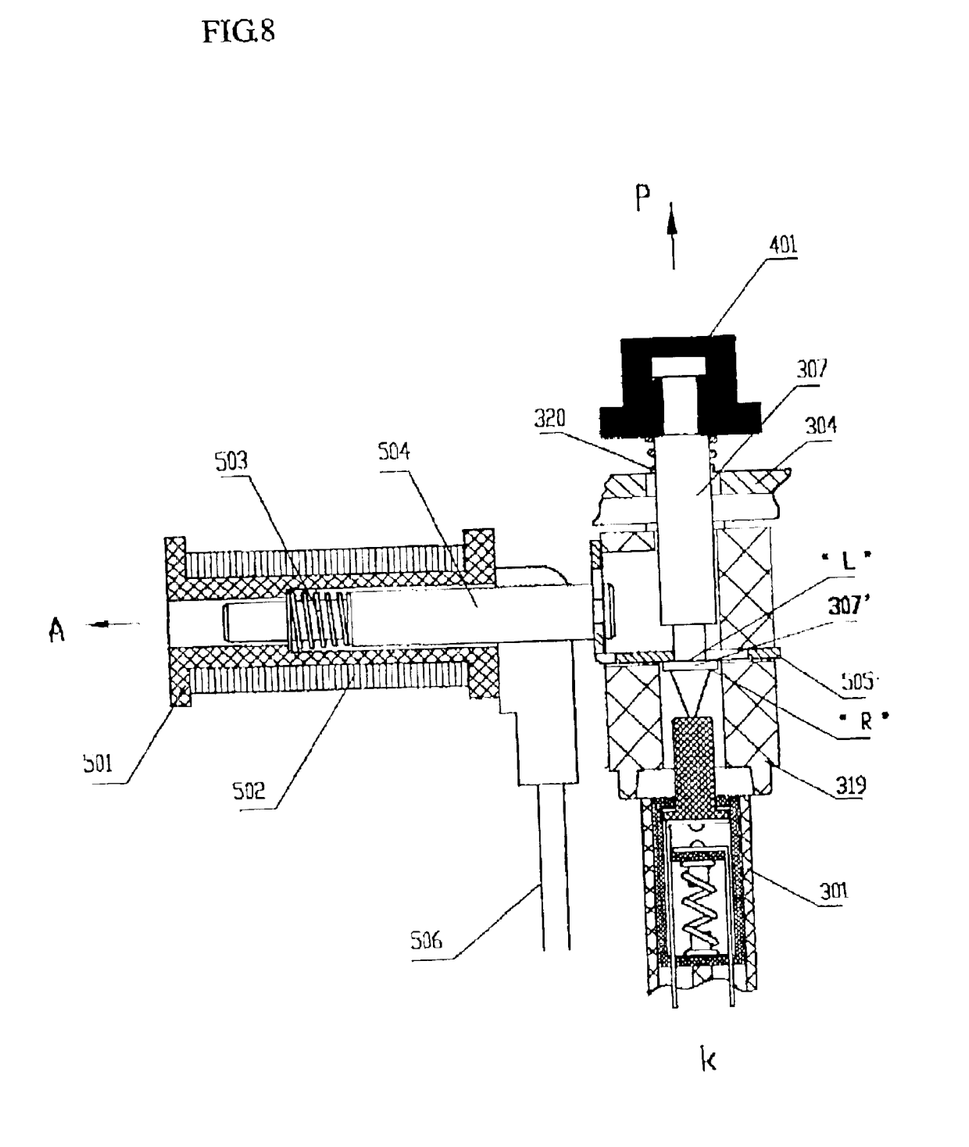
FIG. 8 is a transverse section view, showing the tripper in the closing condition.

Refer to FIG. 8. The tripper is in the closed state. The movable contacts and the fixed contacts keep conducting well, caused by the elasticity of the reset spring 320.

Figure 9:
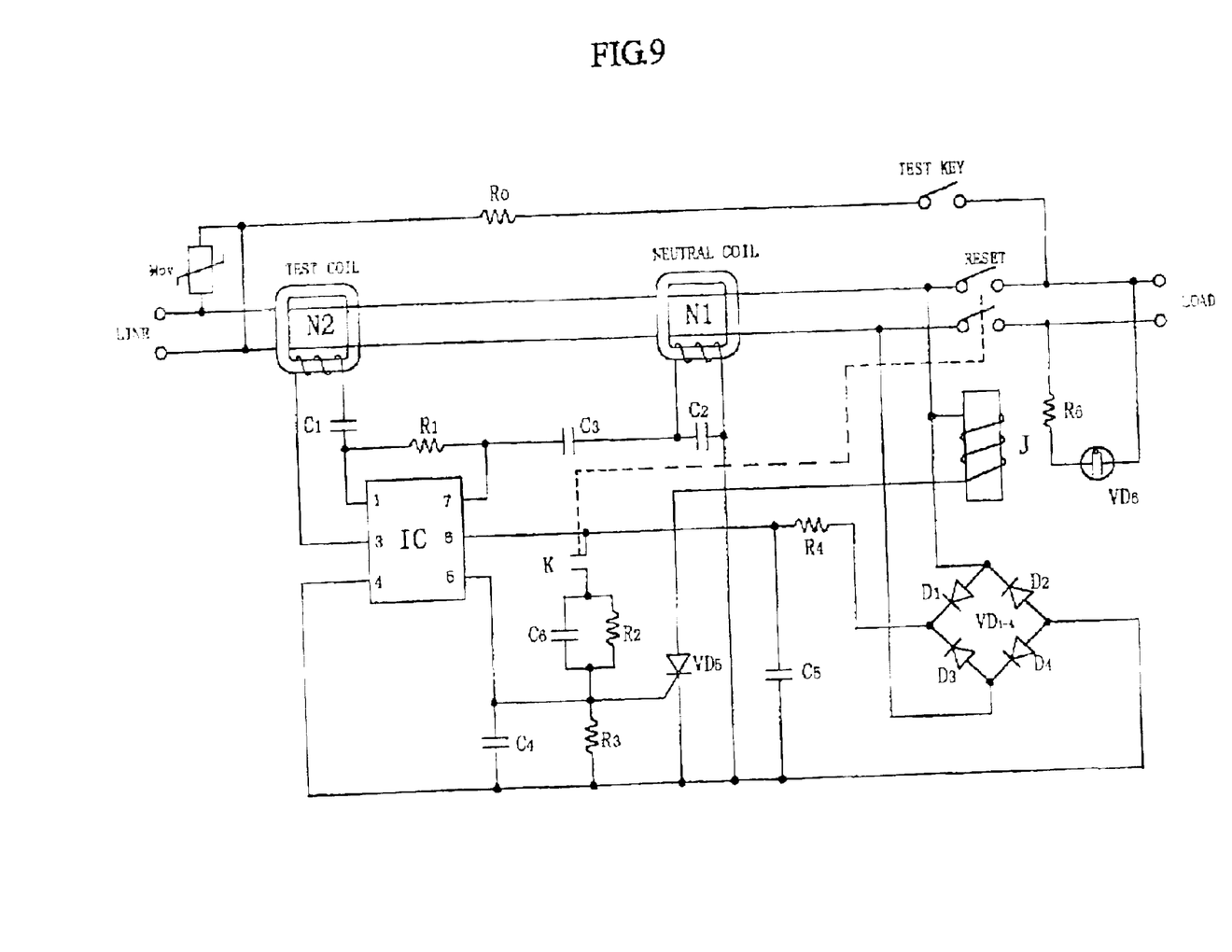
FIG. 9 is a circuit diagram of GFCI receptacle according to the present invention.

FIG. 9 is a circuit diagram of ground fault receptacle according to the present invention. The diode $D_1$~$D_4$ forms a rectifier circuit. The AC input terminal is connected with the line of GFCI device, $R_4$ is called filter resistor and $C_5$ is called filter capacitor. One end of the contact switch K is connected with $R_4$ and $C_5$; the another end of the contact switch K is connected with $R_2$ and $C_6$; the another end of $R_2$ and $C_6$ is connected with $VD_5$ the gate pole of silicon controlled rectifier (SCR) and $R_3$; the negative pole of silicon controlled rectifier (SCR) and $R_3$ connected with $D_2$ and $D_4$; one end of the trip coil J is connected with the power source; the another end is connected with the positive pole of silicon controlled rectifier (SCR).

Figure 4:
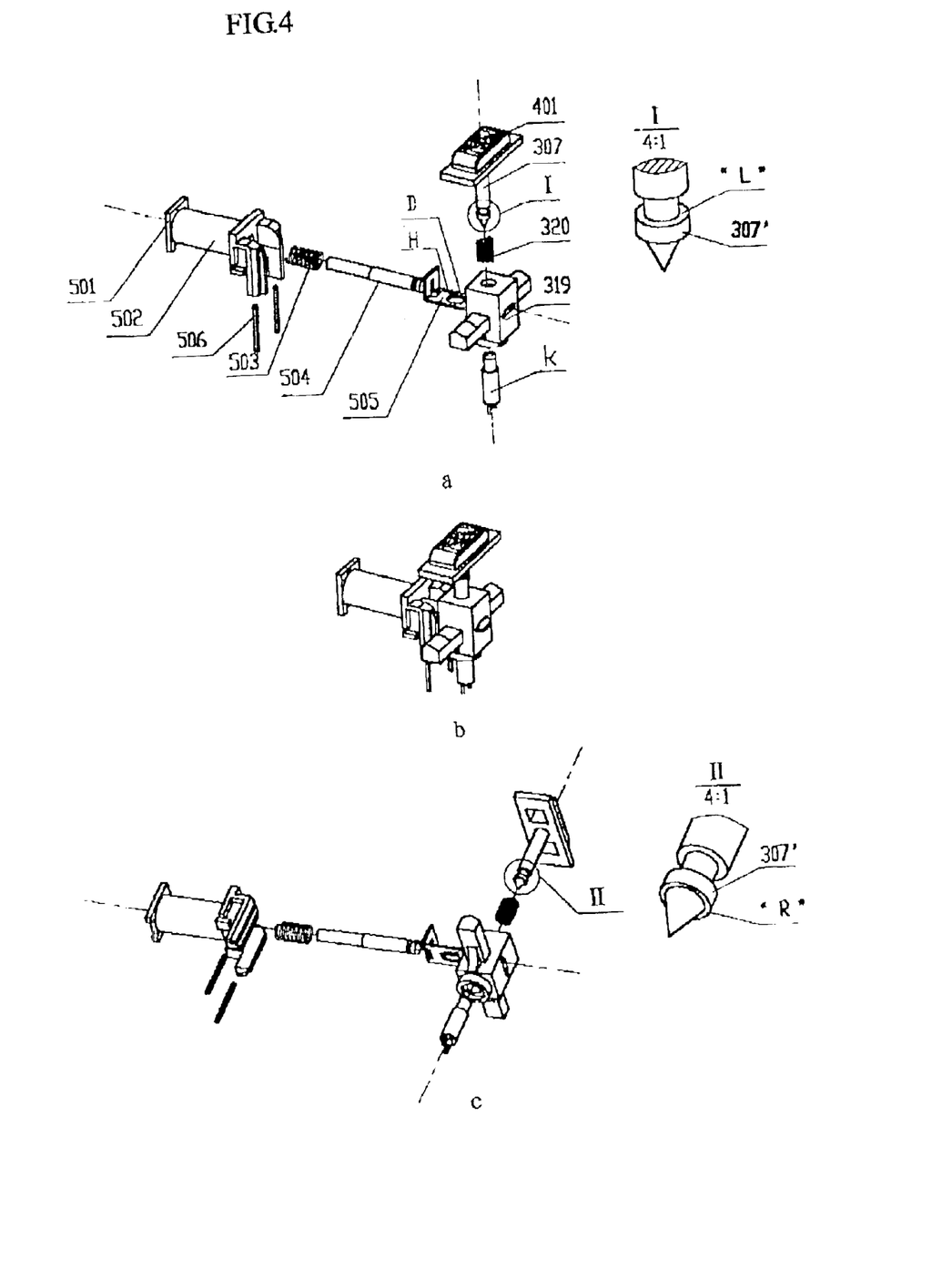
FIGS. 4a and 4c are exploded views of the tripper, shown in different angles.
FIG. 4b is a perspective view of the tripper.

The power source of the control circuit is connected with the power source terminal of the GFCI device. When GFCI is energized, the control circuit of GFCI device is also energized. As is shown in FIG. 4, when the reset button is depressed, the poll rod 307 moves in the direction of the arrow P. When the side R of the flat 307' is touching or to be touching the latch 505, the taper part of the pull rod 307 will activate the contact switch K and make it closed. Thereby, referring to FIG. 9, the DC source electricizes the capacitance C6 and produces a trigger signal to gate the silicon controlled rectifier (SCR) $VD_5$ into conduction and the trip coil 502 is energized. The energized time will be 20~40 mS. In other words, the trip coil will produce an electromagnetic force which keeps acting on the plunger 504 for about 20~40 mS. As mentioned above, $C_6$ and $R_3$ form an electricized circuit that is connected in series with the contact switch K, the silicon controlled rectifier (SCR) $VD_5$ is connected in series with the trip coil 502, and the R3 is connected with the G-pole of the SCR. These form a time relay circuit that keeps the trip coil energized for 20~40 mS at a time.

If miswired by connecting the load to the line, before the reset closes, the control circuit is de-energized. Therefore, even if the contact switch K keeps closed, the trip coil can't be energized and can't produce a electromagnetic force to act on the plunger 504 activating the latch 505 to move along the direction of the wow A. It makes the flat 307' of the pull rod not pass through the lock hole 505b of the latch. In other words, the pull rod can't activate the balance frame to lift the movable contacts against the fixed contacts. So the GFCI receptacle is still in de-energized condition, consequently, achieving the goal for reverse wiring protection.

Figure 10:
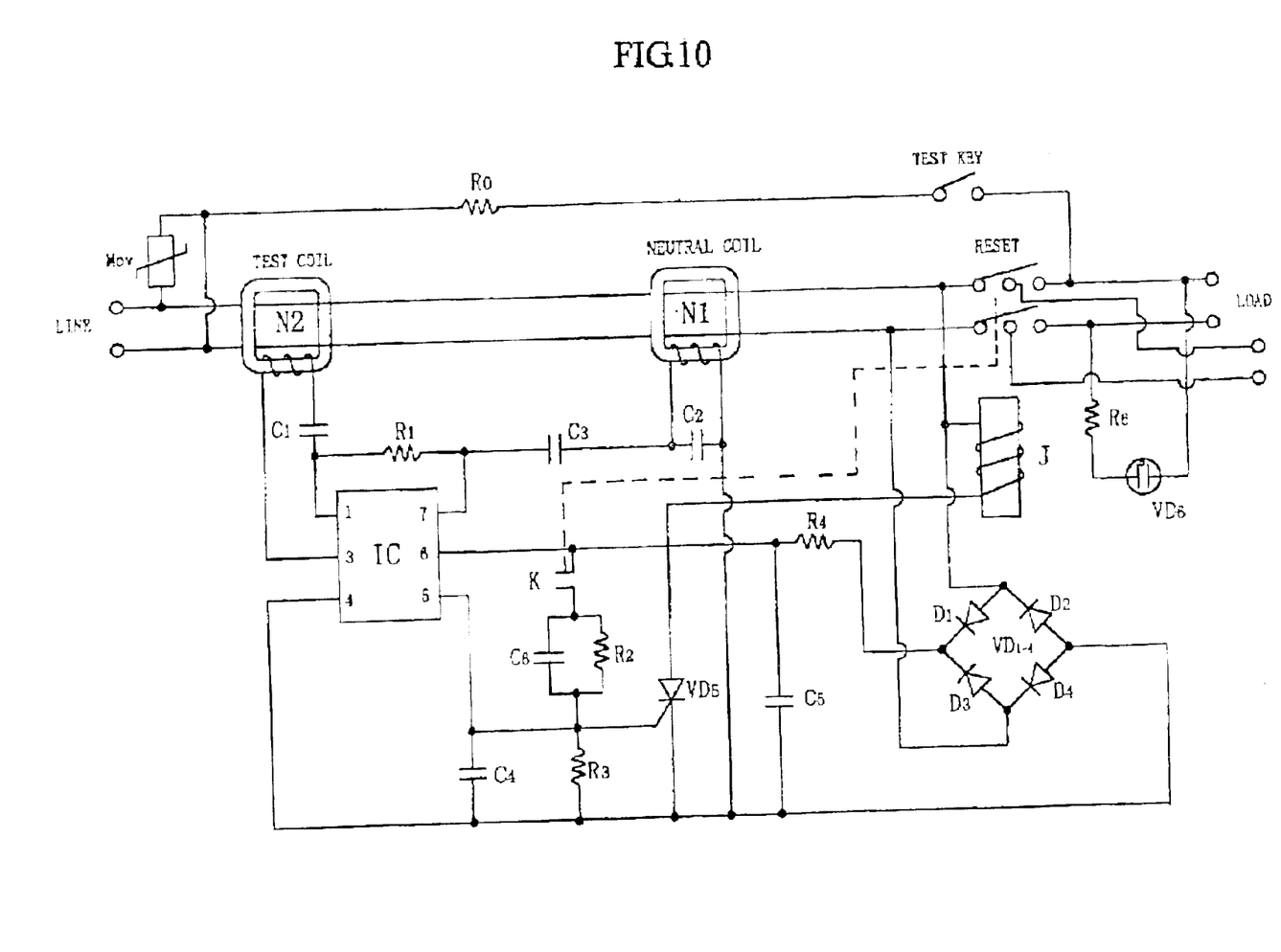
FIG. 10 is a circuit diagram illustrating the plug receiving holes of GFCI face portion de-energized, if miswired by connecting the line to the load.

FIG. 10 is a circuit diagram illustrating the plug receiving holes of GFCI face portion, if inadvertently miswired by connecting the line to the load, it is de-energized. Because of the addition of two contacts between the movable contacts and the fixed contacts, if inadvertently miswired by connecting the line to the load, the control circuit of GFCI as well as plug receiving holes of face portion is de-energized.

As noted above, the ground fault circuit comprises sensor, trip circuit, test circuit and reset circuit; the sensor comprises sensing transformer N2, and neutral transformer N1. The AC line and neutral conductors pass through the transformers. In operation, the sensing transformer N2 serves as a differential transformer for detecting a current leakage between the line side of the load terminal and an earth ground, while the neutral transformer N1 detects current leakage between the neutral side of the load terminal and an earth ground. In the absence of a ground fault condition, the currents flowing through the conductors will be equal and opposite, and no net flux will be generated in the core of the sensing transformer N2. In the event that a connection occurs between the line side of the load terminal and ground, however, the current flowing through the conductors will no longer precisely cancel and a net flux will be generated in the core of the sensing transformer N2. When the flux increases about 5 mA, it will give rise to a potential approximately 10 mV two times at the output of the sensing transformer N2, and this output is applied to the inputs 1 and 3 of the amplifier IC and trip circuit to produce a trip signal on the output terminal 5. If the ground fault condition results from the neutral side of the load terminal being connected to ground, a magnetic path is established between the sensing transformer N2 and the neutral transformer N1. When this occurs, a positive feedback loop is created around an operational amplifier within the amplifier IC and trip circuit, and the resulting oscillations of the amplifier IC will likewise give rise to the trip signal on the output terminal 5.

Resistor $R_1$ is utilized as a feedback resistor for setting the gain of the circuit and hence its sensitivity to ground faults. The capacitors $C_1$ and $C_3$ provide AC input coupling. In the absence of a ground fault condition, no output is produced by the amplifier IC and trip circuit on the output terminal 5 Under these circumstances, a silicon controlled rectifier (SCR) $VD_5$ connected across the output terminals of the full-wave bridge rectifier in the form of $D_1$~$D_4$ is maintained in a non-conducting state. Since the current drawn by the resistor $R_4$ and amplifier and trip circuit is not sufficient to operate the trip coil, the plunger remains motionless. The occurrence of a ground fault condition causes the amplifier and trip circuit to produce an output on terminal 5 which is applied to the gate terminal of the SCR $VD_5$, thereby rendering the SCR conduction. This produces a short circuit across the outputs of the full-wave bridge rectifier, thereby providing a low-impedance path for current to flow through the trip coil. The resulting movement of the plunger causes the movable contacts to move to the open position, thereby removing power from the entry ports of the face portion and the load terminals This ensures that the GFCI receptacle will be in a condition to detect a ground fault condition immediately upon being reset.

A capacitor $C_4$ is connected between the gate and cathode of the SCR $VD_5$ to serve as a filter for preventing narrow noise pulses from triggering the SCR. The circuit shown in FIG. 9 (and FIG. 10) also includes a metal oxide varistor (Mov) connected across the input terminals of the AC power source, in order to protect the whole control circuit from transient voltage surges.

For reverse line protection control circuit, one end of contact switch K is connected to the power source, the other end is connected with $C_6$ and $R_2$, the other $C_6$ and $R_2$ connection portion is connected to the one end of SCR G-pole and $R_3$, the other end of $R_3$ is connected to the ground.

In addition, the current limiting resistor $R_0$ is connected to the power source, the other end of resistor $R_0$ is connected to the test switch, the other end of test switch is connected to the other end of load. When the test switch is momentarily depressed, sufficient current will flow through the resistor $R_0$ to cause an imbalance in the current flowing through the sensing transformer. This will simulate a ground fault condition, causing the amplifier and trip circuit to produce an output signal on the output terminal 5 that gates the SCR into conduction and thereby momentarily energizes the trip coil. The resulting movement of the plunger causes the contacts to open, as will occur during an actual ground fault condition.

Simultaneously, the GFCI receptacle also provides an indication circuit, where a current limiting resistor $R_6$ is connected in series with a light-emitting diode LED $VD_6$, and they are connected directly to the terminals of the load. When the reset button is depressed and the GFCI receptacle is energized, the LED will be illuminated. This affords a visual indication to the installer and the user that the GFCI receptacle is in the normal conduction.

While the fundamental features of the present invention have been shown and described and pointed out, it will be understood that various modifications and substitutions and changes of the form and details of the device described and illustrated and in its operation may be made by those skilled in the art, without departing from the spirit of the invention.

What is claimed is:

1. A reverse wiring protection device for GFCI receptacles, the device comprising: a pull rod, a latch, a balance frame, a trip coil, a contact switch (K) and a control circuit, wherein said pull rod has a flat on one end and a reset button on the other end with first axis, said pull rod associated with a reset spring, said flat having a first surface (L) and a second surface (R), said pull rod to move along said first axis between a first position and a second position, said pull rod to activate said contact switch (K) in said first position, the first surface (L) of said flat to contact with said latch in said second position to enable said pull rod to lift said balance frame through said latch;

wherein said latch comprises a first part and a second part which are both in L-shaped 90 degrees, said balance frame to lift movable contacts against fixed contacts along said first axis;

wherein said trip actuator comprises said trip coil, a trip spring, and a plunger to move along first axis perpendicularly, one end of said plunger coupled with said second part of said latch to activate said latch to move along a second axis between a lock position and an unlock position, in the lock position, said second part of said latch being able to block said flat to pass, in the unlock position, said plunger being able to overcome the bias force from said trip spring to make said latch activated and release the flat;

said contact switch (K) to make said trip coil energized or de-energized;

said control circuit to maintain the energized time for said trip coil, when it is energized by said contact switch, wherein said pull rod has a taper end on the end of flat to contact with said contact switch (K), the first part of said has a narrow slot, and the second part of said latch has a lock hole, of which one end is circular and the other end is rectilinear.

2. The reverse wiring protection device according to claim 1, wherein the end of said plunger has an annular groove, the two sides of the slot of said latch are fastened into the annular groove of said plunger, so that the movement of said plunger can be transferred to said latch along the second axis direction, in this way, said pull rod could be locked and unlocked by said latch.

3. The reverse wiring protection device according to claim 1, wherein said contact switch (K) closes when the second surface (R) of said flat is touching or to be touching said latch.

4. The reverse wiring protection device according to claim 3, wherein said contact switch (K) is a micro-switch.

5. A reverse wiring protection device for GFCI receptacles, the device comprising: a pull rod, a latch, a balance frame, a trip coil, a contact switch (K) and a control circuit, wherein said pull rod has a flat on one end and a reset button on the other end with first axis, said pull rod associated with a reset spring, said flat having a first surface (L) and a second surface (R), said pull rod to move along said first axis between a first position and a second position, said pull rod to activate said contact switch (K) in said first position, the first surface (L) of said flat to contact with said latch in said second position to enable said pull rod to lift said balance frame through said latch;

wherein said latch comprises a first part and a second part which are both in L-shaped 90 degrees, said balance frame to lift movable contacts against fixed contacts along said first axis;

wherein said trip actuator comprises said trip coil, a trip spring, and a plunger to move along first axis perpendicularly, one end of said plunger coupled with said second part of said latch to activate said latch to move along a second axis between a lock position and an unlock position, in the lock position, said second part of said latch being able to block said flat to pass, in the unlock position, said plunger being able to overcome the bias force from said trip spring to make said latch activated and release the flat;

said contact switch (K) to make said trip coil energized or de-energized;

said control circuit to maintain the energized time for said trip coil when it is energized by said contact switch, wherein said control circuit includes a silicon controlled rectifier (SCR) and a charge circuit in the form of a resistor connected in parallel with a capacitor, said contact switch connected in series with the charge circuit, and the charge circuit connected in series with a gate pole of the SCR.

6. The reverse wiring protection device according to claim 5, wherein said control circuit maintains about 20–40 mS for said trip coil.

* * * * *